US 8,055,201 B1

(12) United States Patent
Kuan

(10) Patent No.: US 8,055,201 B1
(45) Date of Patent: Nov. 8, 2011

(54) SYSTEM AND METHOD FOR PROVIDING INTEGRATED VOICE QUALITY MEASUREMENTS FOR WIRELESS NETWORKS

(75) Inventor: David Kuan, Vienna, VA (US)

(73) Assignee: Nextel Communications Inc., Reston, VA (US)

(*) Notice: Subject to any disclaimer, the term of this patent is extended or adjusted under 35 U.S.C. 154(b) by 1089 days.

(21) Appl. No.: 11/490,016

(22) Filed: Jul. 21, 2006

(51) Int. Cl.
*H04B 17/00* (2006.01)

(52) U.S. Cl. .................. 455/67.11; 455/67.14

(58) Field of Classification Search .......... 455/67.11, 455/67.13, 414.1, 423, 522, 567; 370/229, 370/338, 395.1; 379/142.02; 726/27
See application file for complete search history.

(56) References Cited

U.S. PATENT DOCUMENTS

| 5,644,623 | A  | * | 7/1997  | Gulledge ................ 455/423 |
| 5,848,384 | A  |   | 12/1998 | Hollier et al. |
| 5,987,320 | A  |   | 11/1999 | Bobick |
| 6,201,960 | B1 |   | 3/2001  | Minde et al. |
| 6,661,780 | B2 | * | 12/2003 | Li ................ 370/324 |
| 6,665,529 | B1 | * | 12/2003 | Mills, Jr. ............. 455/411 |
| 6,823,302 | B1 |   | 11/2004 | Atkinson et al. |
| 7,403,604 | B2 | * | 7/2008  | Mundra et al. ......... 379/142.02 |
| 2003/0227870 | A1 |   | 12/2003 | Wagner et al. |
| 2004/0037269 | A1 | * | 2/2004 | Lundin ............. 370/352 |
| 2004/0121772 | A1 | * | 6/2004 | Rue .............. 455/436 |
| 2004/0203855 | A1 | * | 10/2004 | Veerasamy et al. ...... 455/456.1 |
| 2005/0041597 | A1 | * | 2/2005 | Wang et al. ............ 370/252 |
| 2005/0096016 | A1 | * | 5/2005 | Tervo et al. .......... 455/414.1 |
| 2005/0114176 | A1 | * | 5/2005 | Dominick et al. ......... 705/2 |
| 2005/0130645 | A1 |   | 6/2005 | Albert Dobson et al. |
| 2005/0197110 | A1 | * | 9/2005 | Hasan et al. .......... 455/417 |
| 2005/0261017 | A1 | * | 11/2005 | Vaittinen et al. ........ 455/522 |
| 2005/0287954 | A1 | * | 12/2005 | Lim et al. ............ 455/67.11 |
| 2006/0104218 | A1 | * | 5/2006 | Kako ................ 370/252 |
| 2006/0160579 | A1 | * | 7/2006 | Ure ................. 455/567 |
| 2006/0199548 | A1 | * | 9/2006 | Saraby .............. 455/67.13 |
| 2006/0217113 | A1 | * | 9/2006 | Rao et al. ............ 455/422.1 |
| 2006/0221942 | A1 | * | 10/2006 | Fruth et al. .......... 370/356 |
| 2006/0227763 | A1 | * | 10/2006 | Croak et al. .......... 370/352 |
| 2006/0252376 | A1 | * | 11/2006 | Fok et al. ............ 455/67.13 |
| 2006/0291450 | A1 | * | 12/2006 | Ramachandran et al. .... 370/352 |
| 2006/0291477 | A1 | * | 12/2006 | Croak et al. .......... 370/395.51 |
| 2007/0143858 | A1 | * | 6/2007 | Hearty ............... 726/27 |

FOREIGN PATENT DOCUMENTS

WO     WO 02/065456 A1    8/2002

* cited by examiner

*Primary Examiner* — Edward Urban
*Assistant Examiner* — Golam Sorowar

(57) ABSTRACT

A system and method for providing integrated voice quality measurements for wireless networks, based on actual calls made by end devices, are provided. The system includes a plurality of end devices, each of which includes an algorithm for determining voice quality data; an over-the-air server configured to enable voice quality reporting in the end devices; a messaging server configured to receive voice quality reports from the end devices; a voice quality server configured to receive the voice quality reports from the messaging server and consolidate the voice quality reports; and a call data record server configured to combine call records and the consolidated voice quality reports.

21 Claims, 5 Drawing Sheets

SYSTEM AND METHOD FOR PROVIDING INTEGRATED VOICE QUALITY MEASUREMENTS FOR WIRELESS NETWORKS

BACKGROUND OF THE INVENTION

The present invention relates to a system and method for providing integrated voice quality measurements for wireless networks.

Determination of voice quality for a telecommunications network has traditionally been an expensive and tedious process where data is collected using test calls and reference speech files. Data is then submitted to a subjective voice quality measurement facility, e.g., Dynastat, Inc., to evaluate quality in accordance with International Telecommunications Union (ITU) P.800 standards. This process is typically a relatively costly endeavor. Alternatively, the same field-collected data may be processed using existing objective measurement tools, in accordance with ITU P.862, which is a standard for calculating telephone call quality using the Perceptual Evaluation of Speech Quality (PESQ) method.

Test calls are often made through coordinated field personnel, which is a logistically intensive process that requires detailed coordination. Only an identified suite of test calls can be made to try to provide a sufficient sample that accurately reflects subscribers' calling patterns in the production network.

If a subscriber is not satisfied with the voice quality of a call, he may call a customer service telephone number to complain about the quality. Complaints about voice quality require subscribers to identify details of calls, e.g., location, time of data, etc., after the call has been completed. There is, however, no automated way to assess voice quality at the demarcation point between a subscriber and an operator to an external carrier for a Service Level Agreement (SLA) dispute.

In one known system including a server and clients, one client end injects a reference speech file into a production network and another client end records the resultant speech. Both files are fed into a server that compiles the result for reporting. This architecture, however, is not able to provide the complete sample with additional information such as Carrier-to-Interference (C/I) data, location, etc. There is no way to replicate the call scenario for a bad call complaint. The architecture can only assess impairments in the core network. Furthermore, the sample provides limited information and does not take into account the entire subscriber population.

SUMMARY OF THE INVENTION

The present invention allows for voice quality measurements to be collected automatically from actual calls from subscribers. The speech used for measurements is actual speech from subscribers instead of reference speech files. There is no need to coordinate test calls from field personnel, since the entire (or operator selected) subscriber population can provide the field data just from making voice calls from their end devices. This reflects a much more complete sample and is most reflective of subscriber population calling patterns. Complaints from subscribers about voice quality can be reconciled with reported data, so that a resolution can be identified much more easily. Collected and reconciled measurements can also be readily used in an SLA dispute on voice quality. There is significant cost savings that can be realized with the present invention with respect to maintaining and assessing voice quality in the production network.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
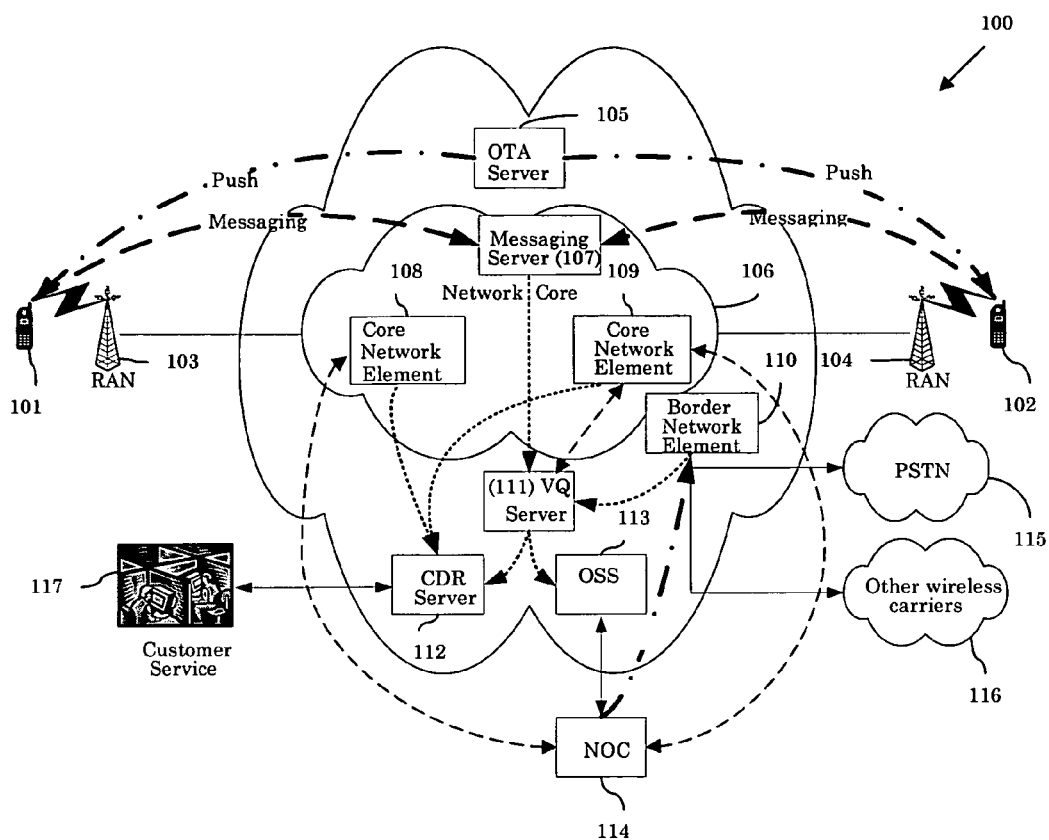
FIG. 1 illustrates an exemplary embodiment of a system for voice quality data collection, in accordance with the present invention.

FIG. 1 illustrates an exemplary embodiment of a system for voice quality data collection, in accordance with the present invention. The system 100 may include a plurality of end devices, e.g., Mobile Stations 101 and 102, Radio Access Network (RAN) 103 and RAN 104, and an Over-The-Air (OTA) Server 105. The system 100 may also include a Network Core 106, which may include a Messaging Server 107 and Core Network Elements 108 and 109. The mobile stations may be cellular telephones, PDAs, push e-mail devices (e.g., RIMs and Blackberries), etc.

The system 100 may also include a Border Network Element 110, a Voice Quality (VQ) Server 111, a Call Data Record (CDR) Server 112, an Operational Support System (OSS) 113, and a Network Operations Center (NOC) 114. The Border Network Element 110 may be a media gateway or Session Border Controller (SBC), for example. The Border Network Element 110 may connect the network to other networks, e.g., a Public Switched Telephone Network (PSTN) 115 and other wireless carriers 116. The system 100 may also be connected to Customer Service 117.

An interface such as TL1 may be established so that specific, or all, border network elements and/or core network elements can be enabled or disabled for voice quality reporting from the NOC 114.

The OTA Server 105 may perform a push procedure to enable or disable a voice quality reporting mechanism for end devices, e.g., mobile stations 101 and 102. For example, the OTA Server 105 may send a voice quality reporting enable command to the mobile stations 101 and 102. Once the mobile stations receive this command, they begin providing voice quality reporting data for all subsequent new calls. In another example, the OTA Server 105 may send a voice quality reporting disable command to the mobile stations 101 and 102. Once the mobile stations receive this command, they stop providing voice quality reporting data for all subsequent new calls.

The mobile stations 101 and 102, Border Network Element 110, and a voice mail system, which may be provided in a Core Network Element 108 or 109, may each be embedded with an algorithm for determining voice quality reporting data. When voice quality reporting is enabled, these elements may periodically output the voice quality reporting data (e.g., once every second) or automatically output the voice quality reporting data at the end of a call.

Mobile stations 101 and 102 may send voice quality reports to the Messaging Server 107, which may forward the voice quality reports to the VQ Server 111. The mobile stations may transmit their voice quality reporting data periodically, e.g., once every second, or may be set to automatically provide the data at the end of a call. Information in the voice quality reports may include objective Mean Opinion Score (MOS), location, vocoder version and C/I data. Also, the Border Network Element 110 may send voice quality reports to the VQ Server 111. The VQ Server 111 may consolidate voice quality reports in the network and submit the consolidated voice quality report to the CDR Server 112 for reconciliation with call data records, and to the OSS 113 for reports and metrics.

The Core Network Elements 108 and 109 that provide inputs to Call Data Records (CDR) may submit information for the CDR Server 112. The Core Network Elements 108 and 109 may be any type of known switching elements that can provide call information to the CDR Server 112, e.g., a Base Transceiver Station (BTS), Home Location Register (HLR), Home Subscriber Server (HSS), etc. The CDR Server 112 may combine call records with voice quality reports and make this information available to Customer Service 117 for review. Customer Service 117 may pull Call Data Records with voice quality report details when a subscriber calls in a complaint of bad calls. Thus, Customer Service 117 may use the voice quality report data to evaluate the subscriber's complaint.

To allow for the most flexibility, voice quality reporting functionality can be enabled or disabled via an OTA mechanism. An OTA server 105, for example, can be configured to enable or disable all or a selected list of end devices, e.g., mobile stations 101 and 102. This allows for the flexibility of selected sampling or a complete sampling as needed. This capability also allows for management of resources, e.g., messaging, VQ Server 111, etc., as the resources are not needed when voice quality reporting is disabled. The voice quality reporting functionality allows for the end devices component for full reporting for Mobile-to-Mobile (M2M) call scenarios (i.e., calls from one mobile station in a network to another mobile station in the same network) and partial reporting for Mobile-to-Wireless (M2W) (i.e., a call from a mobile station in one network to a mobile station in another network) and Mobile-to-Land (M2L) (i.e., a call from a mobile station in a network to a land line device) call scenarios.

In another exemplary embodiment of the present invention, for M2W and M2L, partial reporting may be provided by Border Network Element 110 where the demarcation for other wireless carriers 116 or PSTN 115 resides. The Border Network Element 110 can enable or disable voice quality reporting end devices in other wireless carriers 116 and PSTN 115.

Figure 2:
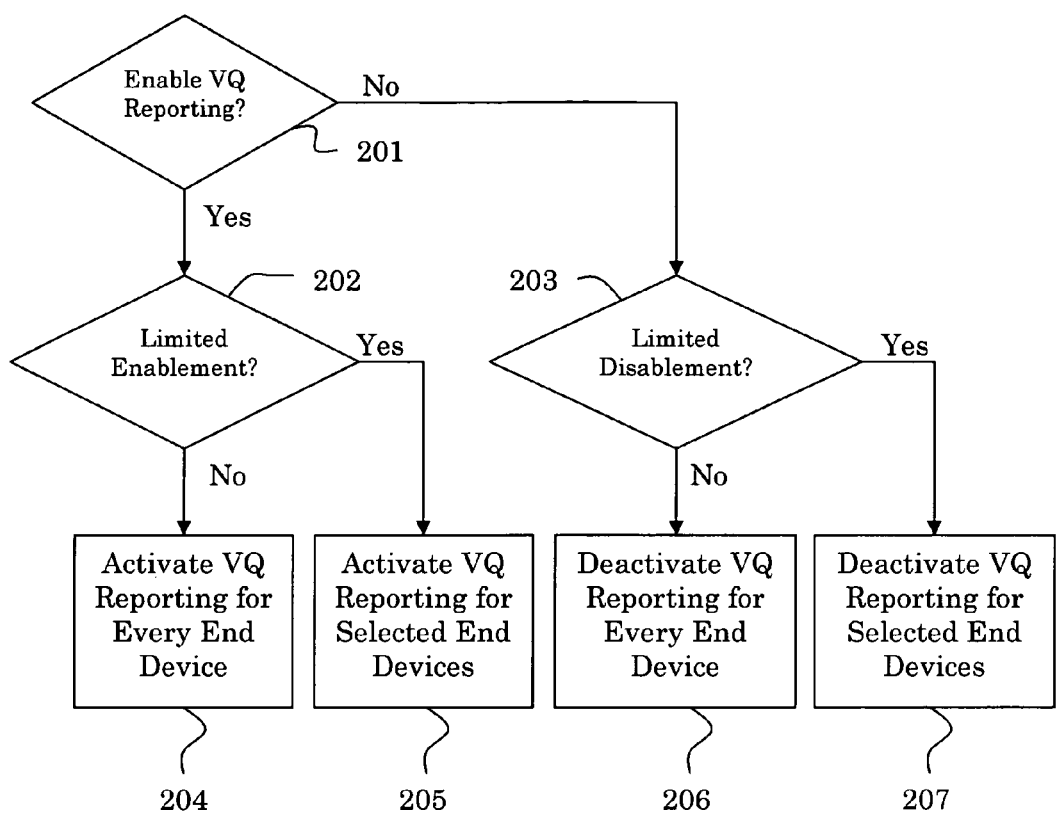
FIG. 2 illustrates an exemplary embodiment of a method for selectively enabling and disabling voice quality functionality of mobile devices, in accordance with the present invention.

FIG. 2 illustrates an exemplary embodiment of a method for selectively enabling and disabling voice quality functionality of mobile devices, in accordance with the present invention. In step 201, a determination is made whether voice quality reporting is enabled. If voice quality reporting is enabled, the method proceeds to step 202, in which it is determined whether the enablement of voice quality reporting is limited. If the voice quality enablement is not limited, then, in step 204, voice quality reporting functionality is enabled for every wireless end device. If it is determined in step 202 that the enablement of voice quality reporting is limited, then voice quality reporting functionality is activated for selected wireless end devices in step 205.

If it is determined in step 201 that voice quality reporting is not enabled, then a determination is made in step 203 of whether there is limited disablement. If there is not limited disablement, then, in step 206, voice quality reporting functionality is deactivated for every wireless end device. If it is determined in step 203 that there is limited disablement, then voice quality reporting functionality is deactivated in step 207 for selected wireless end devices.

Figure 3:
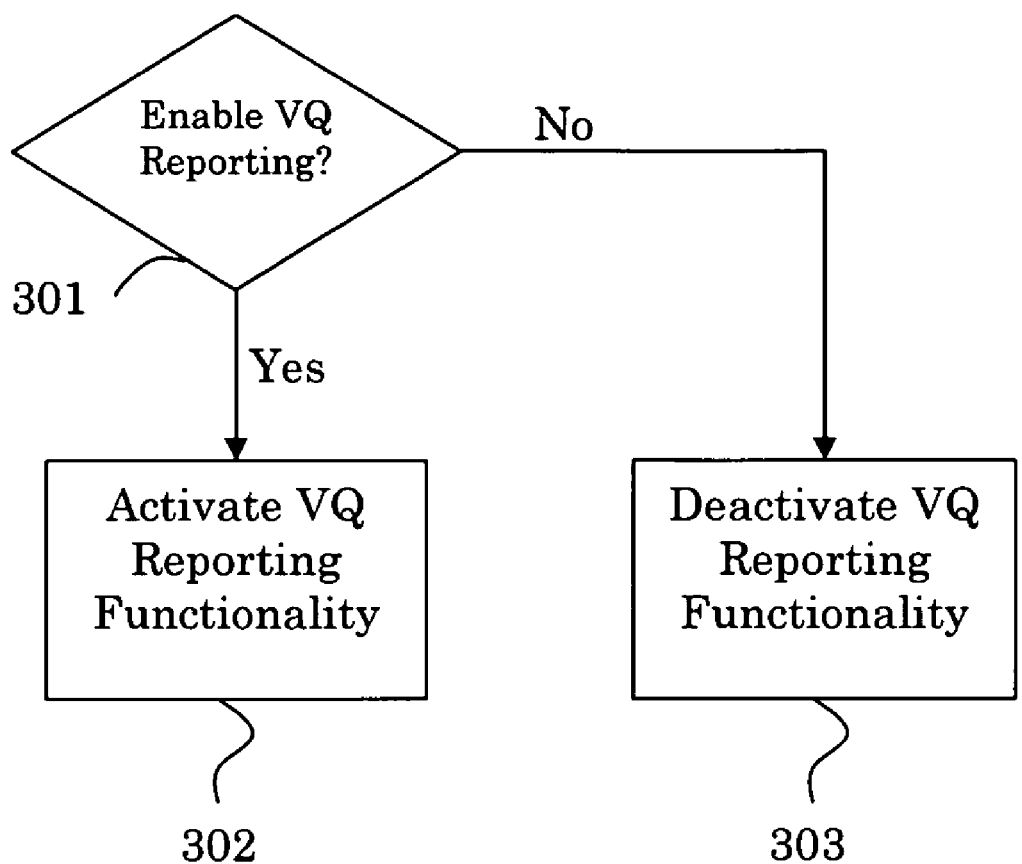
FIG. 3 illustrates an exemplary embodiment of a method for activating and deactivating voice quality reporting functionality, in accordance with the present invention.

FIG. 3 illustrates an exemplary embodiment of a method for activating and deactivating voice quality reporting functionality of Border Network Element 110 and/or Core Network Elements 108 and/or 109, in accordance with the present invention. In step 301, a determination is made whether voice quality reporting is enabled. If voice quality reporting is enabled, the method proceeds to step 302, in which voice quality reporting functionality is activated. If voice quality reporting is not enabled, then, in step 303, voice quality reporting functionality is deactivated.

In another exemplary embodiment of the present invention, additional functionality may be added to the end devices, e.g., M2M, M2W, M2L and Mobile-to-Voice-Mail (M2VM) (i.e., a call from a mobile station to a voice mail system) scenarios) and Border Network Element 110 (e.g., M2W and M2L scenarios, where a check on voice quality reporting functionality is performed. If the functionality is enabled, the voice quality may be objectively measured using non-intrusive methods, e.g., ITU P.563, over a preset time interval. ITU P.563 is an ITU standard that can be used to calculate call quality. Multiple measurements may be taken at each interval. Voice quality reporting may then be sent via a messaging mechanism, e.g., one-way messaging, if service to an end device is available at the end of a call.

Because voice mail systems use audio compression to reduce the amount of voice data for storage, these systems lose some voice quality when the voice data is stored. By using the voice quality reporting of the present invention, the loss in voice quality due to the voice mail system may be determined. Thus, trade-offs between storage cost and quality may be more easily evaluated to provide the optimal voice compression for a voice mail system.

Figure 4:
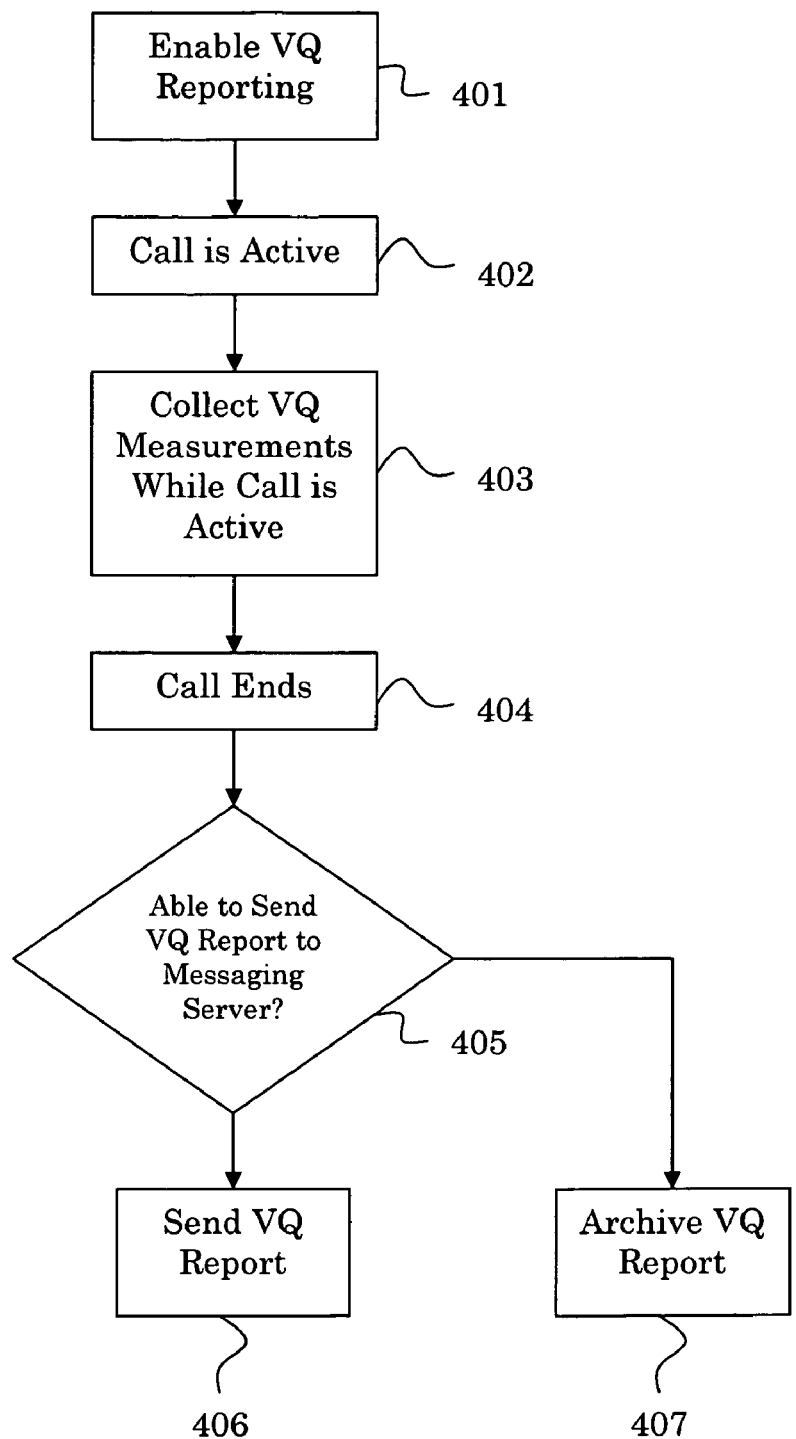
FIG. 4 illustrates an exemplary embodiment of a method for collecting voice quality measurements, in accordance with the present invention.

FIG. 4 illustrates an exemplary embodiment of a method for collecting voice quality measurements, in accordance with the present invention. In step 401, voice quality reporting is enabled. In step 402, a call becomes active. While the call is active and voice quality reporting is enabled, voice quality measurements are collected in step 403. The voice quality measurements may be collected in real time. The call ends in step 404.

In step 405, it is determined whether a voice quality report can be sent to a messaging server. If the voice quality report can be sent to the messaging server, then the voice quality report is sent to the messaging server in step 406. If the voice quality report cannot be sent to the messaging server, then the voice quality report is archived in step 407.

If the call was abnormally terminated due to a dead battery or having a messaging server that is unable to process the request, the voice quality report may be archived until the next time the end device becomes able to send the voice quality report via messaging mechanism. The same process may be performed at the Border Network Element 110 for M2W and M2L call scenarios. Algorithms for voice quality measurements may be based upon psycho-acoustic analysis, e.g., ITU P.563 and ITU P.AAM (Acoustic Assessment Model), or statistical analysis, e.g., ITU G.107, which is a recommended computational model to determine a rating factor (R) for speech quality. A benefit of P.563 is the ability to diagnose a root cause problem for voice quality impairment.

Figure 5:
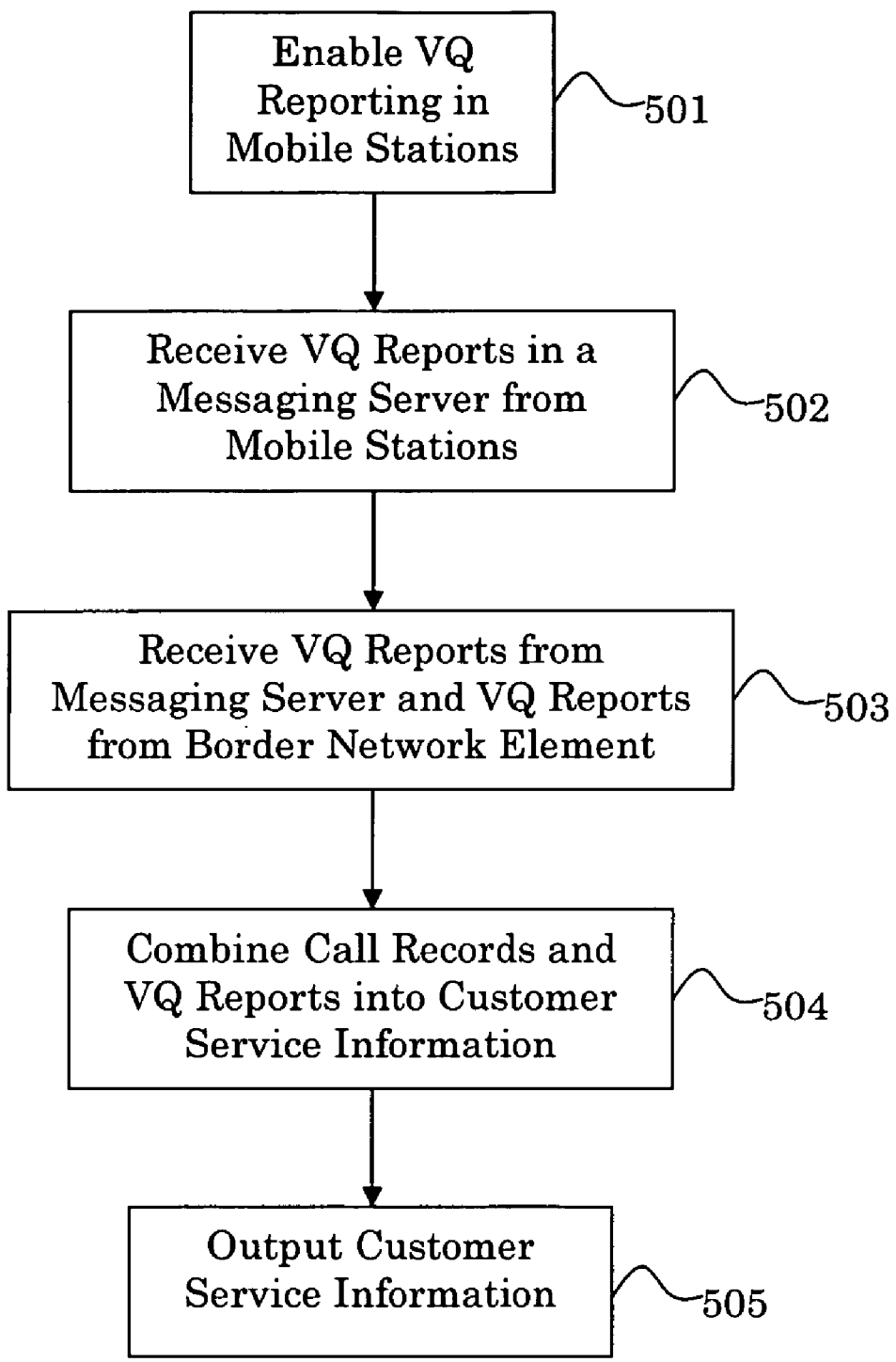
FIG. 5 illustrates an exemplary embodiment of a method for providing voice quality measurements for a wireless network, in accordance with the present invention.

FIG. 5 illustrates an exemplary embodiment of a method for providing voice quality measurements for a wireless network, in accordance with the present invention. In step 501, voice quality reporting is enabled in a plurality of mobile stations. For example, the OTA server 105 may perform a push procedure to enable a voice quality reporting mechanism for end devices, e.g., the mobile stations. The push procedure may include sending a voice quality enable command to the mobile stations. This procedure would be transparent to subscribers on the network and may be repeated periodically for selected end devices that did not acknowledge the enabling request. In step 502, voice quality reports are received by a messaging server from mobile stations or other end devices for current calls and for archived reports from prior calls. These voice quality reports may be forwarded to a voice quality server, which may also receive voice quality reports from a border network element, in step 503. The voice quality reports may be combined in step 504 with call records to produce customer service information. In step 505, the customer service information may be outputted to customer service personnel. The customer service personnel may use the customer service information to resolve subscriber complaints about voice quality.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for providing integrated voice quality measurements for a wireless network, comprising:
   a plurality of end devices, each of which includes an algorithm for determining voice quality data for a non-reference speech signal used to generate voice quality reports without comparing the non-reference speech signal to a reference speech signal;
   an over-the-air server configured to enable voice quality reporting in the plurality of end devices by sending a message to at least one of the plurality of end devices;
   a messaging server configured to receive the voice quality reports from the plurality of end devices;
   a voice quality server configured to receive the voice quality reports from the messaging server and consolidate the voice quality reports;
   a plurality of core network elements, comprising an algorithm for determining the voice quality data, configured to provide additional voice quality reports to the voice quality server for calls between the plurality of end devices terminating at the plurality of core network elements; and
   a call data record server configured to combine call records from a network switching element and the consolidated voice quality reports,
   wherein the voice quality reports comprise mean opinion score, location, vocoder version and carrier-to-interference ratio data.

2. The system of claim 1, further comprising:
   a plurality of core network elements configured to provide call data to the call data record server.

3. The system of claim 1, further comprising:
   a network operations center configured to activate or deactivate voice quality reporting from a border network element or a core network element.

4. The system of claim 1, further comprising:
   an operational support system configured to receive the consolidated voice quality reports and manage the network.

5. The system of claim 1, wherein at least one of the plurality of end devices is configured to periodically output the voice quality reports during a call and at the end of a call.

6. The system of claim 1, wherein one of the core network elements comprises a voice mail system.

7. The system of claim 1, wherein one of the core network elements comprises a media resource processor.

8. The system of claim 1, further comprising:
   a border network element, including an algorithm for determining the voice quality data, configured to provide additional voice quality reports to the voice quality server for calls between the plurality of end devices and at least one device outside of the network.

9. The system of claim 8, wherein the border network element comprises a media gateway.

10. The system of claim 8, wherein the border network element comprises a session border controller.

11. A method for providing integrated voice quality measurements for a wireless network, comprising the acts of:
    enabling voice quality reporting in a plurality of end devices and in a plurality of network elements, by sending a message to the plurality of end devices;
    receiving voice quality reports in a messaging server from the plurality of end devices and the plurality of network elements, wherein the voice quality reports are based on a non-reference speech signal without comparing the non-reference speech signal without comparing the non-reference speech signal to a reference speech signal and comprise mean opinion score, location, vocoder version and carrier-to-interference ratio data;
    receiving the voice quality reports from the messaging server and consolidating the voice quality reports in a voice quality server;
    combining call records from a network switching element and the voice quality reports in a call data records server.

12. The method of claim 11, further comprising the act of:
    disabling the voice quality reporting in at least one of the plurality of end devices.

13. The method of claim 11, further comprising the act of:
    enabling voice quality reporting in the plurality of network elements by a network operations center, wherein the plurality of network elements comprises a border network element or a core network element.

14. The method of claim 11, further comprising the act of:
    selectively determining a number of the plurality of end devices to enable for voice quality reporting.

15. The method of claim 11, wherein receiving the voice quality reports in the messaging server from the plurality of end devices comprises automatically collecting voice quality measurements from actual calls of the plurality of end devices.

16. The method of claim 11, wherein enabling the voice quality reporting in the plurality of end devices comprises a push process from an over-the-air server to the plurality of end devices.

17. The method of claim 16, wherein the push process includes sending an enable command to the plurality of end devices.

18. A method for providing integrated voice quality measurements for a wireless network, comprising the acts of:
sending a message to enable or disable voice quality reporting in a plurality of end devices and network elements;
determining whether voice quality reporting is enabled or disabled;
collecting at the end devices and the network elements voice quality measurements from a call, while the call is active and at the end of the call, if the voice quality reporting is enabled;
determining whether a voice quality report based on the voice quality measurements can be sent to a messaging server, wherein the voice quality report comprises mean opinion score, location, vocoder version and carrier-to-interference ratio data, the voice quality report being based on a non-reference speech signal without comparing the non-reference speech signal to a reference speech signal;
sending the voice quality report to the messaging server, if the voice quality report can be sent to the messaging server; and
archiving the voice quality report, if the voice quality report is not allowed to be sent to the messaging server.

19. The method of claim 18, further comprising the act of:
selectively determining a number of the plurality of end devices to enable or disable for voice quality reporting.

20. The method of claim 18, wherein collecting voice quality measurements from the call comprises automatically collecting the voice quality measurements from an actual call of the plurality of end devices.

21. The method of claim 20, wherein the collecting of the voice quality measurements occurs in real time.

* * * * *